United States Patent [19]

Badoureaux

[11] Patent Number: 5,039,141

[45] Date of Patent: Aug. 13, 1991

[54] ANNULAR CATCH FOR RAPID CONNECTION OF FLEXIBLE OR RIGID TUBE

[75] Inventor: Jean-Pierre Badoureaux, Viuz En Sallaz, France

[73] Assignee: Parker Hannifin RAK S.A., Annemasse, France

[21] Appl. No.: 240,978

[22] Filed: Sep. 6, 1988

[30] Foreign Application Priority Data

Sep. 4, 1987 [FR] France ............................ 87 12711

[51] Int. Cl.⁵ ............................................. F16L 19/07
[52] U.S. Cl. .................................... 285/340; 285/239; 285/321; 285/382
[58] Field of Search ............... 285/340, 321, 382, 238, 285/239

[56] References Cited

U.S. PATENT DOCUMENTS

| 3,019,284 | 1/1962 | Matthysse | 285/340 X |
| 3,204,988 | 9/1965 | Ouderkirk | 285/340 X |
| 4,635,975 | 1/1987 | Campbell | 285/340 |

FOREIGN PATENT DOCUMENTS

| 0507620 | 5/1953 | Belgium | 285/340 |
| 2060106 | 4/1981 | United Kingdom | 285/340 |
| 2067698 | 7/1981 | United Kingdom | 285/340 |

Primary Examiner—Randolph A. Reese
Assistant Examiner—Carol I. Bordas
Attorney, Agent, or Firm—Christopher H. Morgan

[57] ABSTRACT

This catch, which may be used either with rapid connections which can be uncoupled, and those which can not, is of the type which consists of an annular part (2), of spring steel, having teeth (4), directed radially inward, and of which the free edges (4a) are inscribed in a circle (5) of diameter ($D_1$), greater than the outer diameter ($D_2$) of the tube (6) for which the rapid connection equipped with this catch is intended. Each tooth (4) has a free edge (4a) in a circle arc of radius (R) less than that of the circle (5) in which this free edge (4a) is inscribed.

2 Claims, 1 Drawing Sheet

ANNULAR CATCH FOR RAPID CONNECTION OF FLEXIBLE OR RIGID TUBE

BACKGROUND OF THE INVENTION

This invention relates to an annular catch for rapid connection of flexible or rigid tube, that is, of plastic material or of metal, such as aluminum, copper or steel, and which can be used both with connections which can be rapidly uncoupled and with those which can not.

In rapid connections, there is provided an annular catch, that is, an annular piece having teeth turned radially inward, of which the edges are inscribed in a circle of diameter slightly less than the outer diameter of the tube to be coupled with this connection.

Preferably, to obtain a better holding of the tube in connection, while facilitating its introduction, the teeth of the catch are inclined slightly toward the bottom of the connection.

If the catch is of rigid material, a good holding is generally obtained, but the coupling can not be demounted.

If the catch is of flexible and elastic material, such as steel, so as to be able to use a tubular pusher for uncoupling, the holding of the tube is insufficient, especially if the tube is of a hard material, such as steel.

Moreover, the connection of the tube with the catch by rotation is insufficient to oppose the loosening of the tube or even its unscrewing.

The present invention is intended to remedy these difficulties. For this purpose, in the catch it concerns and which is of the said type, of the spring steel, each tooth has a free edge in a circle arc of less radius than that of the circle in which the free edges of the teeth are inscribed, and which is itself less than the outer radius of the tube.

This form of the teeth creates lateral end point which anchor in the tube and give it a good holding, axial and in rotation.

According to another characteristic of the invention, the intervals between teeth or notches have a hollowed-out form in the direction of their bottom, which contributes to the formation, at the free ends of the edges of the teeth, of lateral end points, giving a better elastic flexibility to the teeth, which are more freely directed in their anchoring in the tube.

According to another characteristic of the invention, there is provided, on the periphery of the catch, a tubular collarette, which gives a better peripheral rigidity and, consequently, an excellent axial holding in the body of the connection.

At any rate, the invention will be better understood with the aid of the description which follows, with reference to the attached schematic drawing which shows, by way of example, nonlimiting, one form of execution of this annular catch for rapid connection:

DETAILED DESCRIPTION OF THE INVENTION

Figure 1:
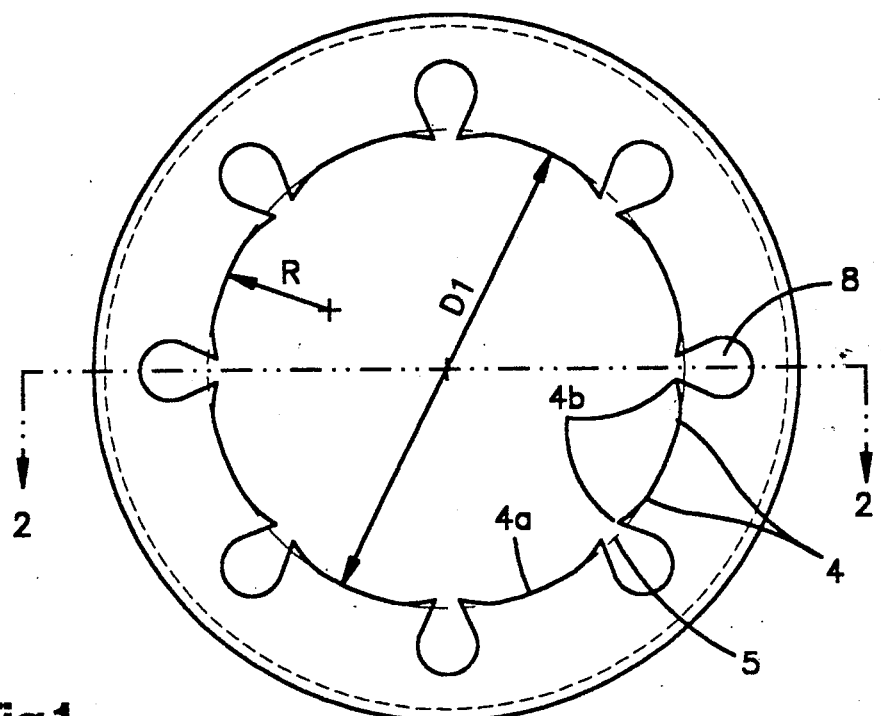
FIG. 1 is a front elevation view.

This annular catch 2, which is designed both for rapid connections which can be uncoupled and those which can not, is of the type which consists of an annular part, of spring steel, having teeth 4 directed radially inward, and of which the free edges 4a are inscribed in a circle 5 of diameter $D_1$ greater than the outer diameter of $D_2$ of the tube 6 for which the rapid connection equipped with this annular catch 2 is intended.

As known per se, the central part 3 of the annular catch 2 is stamped so as to have the form of a cone, the effect of which is to stop each tooth 4 in the direction of the bottom of the rapid connection for which this catch 2 is intended, and which is not shown in the drawing. This known arrangement has the effect, on the one hand, of facilitating the engagement of the tube 6 in rapid connection, and on the other hand, of assuring under the best conditions its holding inside this connection, against the forces of pressure which might tend to expel it, whether the tube is flexible, as in one of plastic material, or rigid, as in one of aluminum, copper or steel.

According to the invention, the free edge 4a of each tooth 4, is profiled in a circle arc R, less than that of the circle 5 in which the free edges 4a of the teeth 4 are inscribed.

Figure 2:
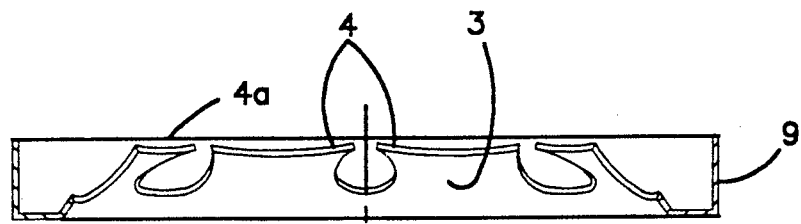
FIG. 2 is a view in section along II—II of FIG. 1.
Figure 2:
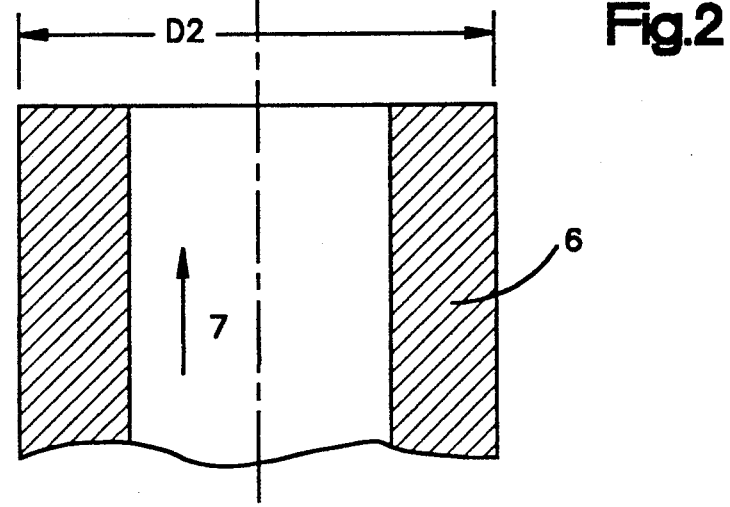

This configuration of the free edges 4a of the teeth 4 causes the formation, in the free edge 4a of each tooth 4, of lateral end points 4b which can anchor in the wall of the tube 6 when the latter is engaged in the catch 2, as indicated by the arrow 7 of the FIG. 2. Namely, the fact that the radius of curvature R of the free edge 4a of each tooth 4 is less than the radius of curvature of the circle 5, in which the free edges 4a of the teeth 4 are inscribed, and with all the more reason, the radius of curvature of the outer surface of the tube 6 has the effect that each tooth 4 rests against the outer surface of the tube 6 only through its lateral side points 4b, which greatly improves the force of penetration of each tooth 4 into the wall of the tube 6.

The formation of the lateral end points 4b of the teeth 4 may be amplified still more by giving the intervals between the teeth or notches 8 a divergent profile toward the bottom of the notch as can be seen clearly from FIG. 1. As a result, each lateral side point 4b then forms a real anchoring horn or point, of which the flexibility also facilitates free orientation.

According to another characteristic of the invention, there is provided on the periphery of the catch 2, a tubular collarette 9, which gives a better peripheral rigidity and, consequently, a better axial holding in the body of the connection.

I claim:

1. An annular catch for use in rapid connection to a tube having a predetermined diameter $D_2$ which is inserted through the catch, comprising:
    an annular body formed of spring steel having teeth extending inwardly from said body in a cone shape, each tooth having an inwardly directed free edge disposed so that said free edges are inscribed in a circle of diameter $D_1$ which is greater than Diameter $D_2$, and wherein said free edge of each of said teeth has a circle arc shape having a radius less than one-half of Diameter $D_1$ so that each free edge has a pair of arcuate lateral end points which extend within the diameter $D_2$ for contacting and holding a tube inserted through the catch; and wherein said body has an opening extending between each of said teeth, each opening having a shape which diverges radially outwardly from said lateral arcuate end points of said teeth so that said teeth have increased flexibility in the direction of the lateral arcuate end points of said teeth to improve orientation of the end points with respect to a tube.

2. The catch of claim 1 wherein said annular body has a radially outer edge with a cylindrical collar extending therefrom for improved peripheral rigidity of said body.

* * * * *